Jan. 6, 1970  J. W. RATCLIFF  3,488,083
BED FOR A TELESCOPIC TRAVEL TRAILER
Filed Feb. 13, 1968  2 Sheets-Sheet 1

Inventor
John W. Ratcliff
By Andrus & Starke
Attorneys

Jan. 6, 1970  J. W. RATCLIFF  3,488,083
BED FOR A TELESCOPIC TRAVEL TRAILER
Filed Feb. 13, 1968  2 Sheets-Sheet 2
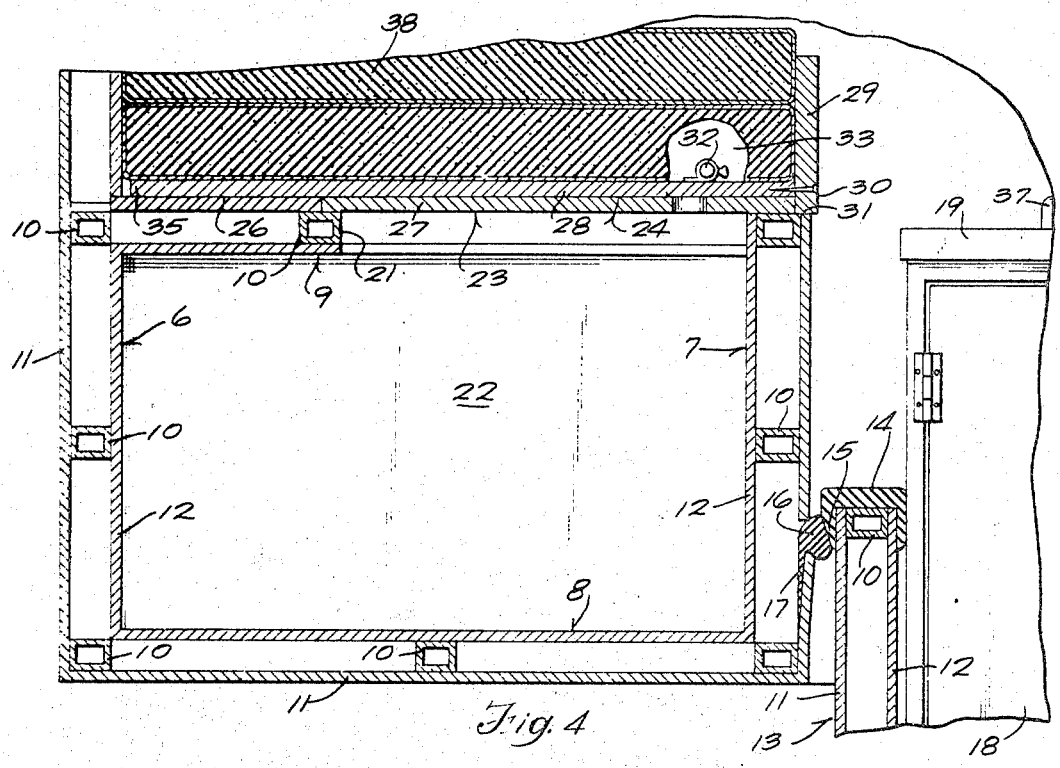
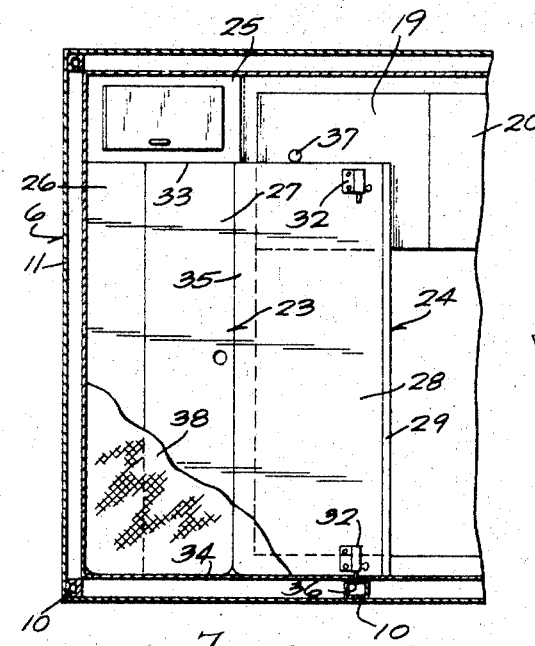
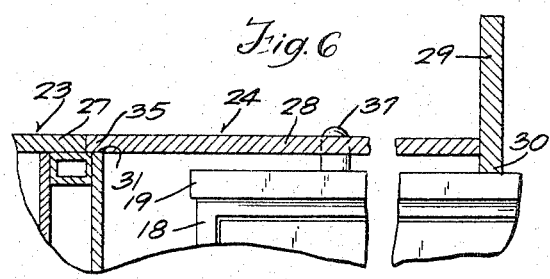
Inventor
John W. Ratcliff
By Andrus & Starke
Attorneys United States Patent Office 3,488,083
Patented Jan. 6, 1970

3,488,083
BED FOR A TELESCOPIC TRAVEL TRAILER
John W. Ratcliff, Marengo, Ill., assignor to Ratcliff Industries, Inc., Juneau, Wis., a corporation of Wisconsin
Filed Feb. 13, 1968, Ser. No. 705,199
Int. Cl. B60p 3/34
U.S. Cl. 296—23
10 Claims

ABSTRACT OF THE DISCLOSURE

The invention relates to an extendible bed for a telescopic travel trailer. The trailer comprises a lower trailer section and an upper trailer section telescopes vertically with respect to the lower section. The upper trailer section is lowered to the retracted position for transporting and raised to an extended position for camping.

The rear end of the upper trailer section is provided with an overhang which projects beyond the corresponding end of the lower trailer section. The overhanging portion contains an extendible bed consisting of a lower bed section and an upper bed section which is stored on the lower bed section. To provide a full size bunk or bed, the upper bed section is pulled inwardly to an extended position and is supported on the upper surface of a cabinet which rests on the floor of the lower trailer section.

---

Travel trailers, campers, boats and other dwellings of limited floor space usually contain convertible beds or bunks which are used for seating or other purposes and can be converted into beds for sleeping.

The present invention is directed to an extendible bed for a telescopic travel trailer. The trailer comprises a lower trailer section and an upper trailer section which telescopes vertically with respect to the lower section. The upper trailer section is adapted to be lowered to a retracted position for transporting and raised to an extended position for camping. The rear end of the upper trailer section and can be extended inwardly to a location beyond the rear end of the lower trailer section and the overhanging portion of the upper trailer section contains an extendible bed which, in its retracted position, is contained wholly within the overhanging portion of the upper trailer section and can be extended inwardly to a location above the lower trailer section to provide a full size bed.

The extendible bed consists of a lower bed section and an upper bed section which is stored flatwise on the lower bed section in the overhanging portion of the upper trailer section. To provide a full size bed, the upper bed section is pulled inwardly to a location above the lower trailer section and is supported on the upper surface of a cabinet which rests on the floor of the lower trailer section.

The extendible bed of the invention, when in the storage position, is located wholly in the overhanging portion of the upper trailer section where it will not interfere with telescopic movement of the upper trailer section and will not detract from the overall floor space of the trailer. The overhanging end portion of the upper trailer section also increases the overall length of the upper trailer section and provides a more spacious appearance for the interior of the trailer thereby increasing the market appeal for the trailer.

The upper bed section can be readily extended to provide a full size bed and when extended, the upper bed section is supported primarily on the top of a cabinet which rests on the floor of the lower trailer section so that the cabinet performs the dual function of providing storage space as well as serving as a support for the section in the extended position.

Other objects and advantages will appear in the course of the following description:

The drawings illustrate the best mode presently contemplated of carrying out the invention.

In the drawings:

FIG. 4 is a vertical section of the overhanging portion of the upper trailer section showing the bed in the storage position;

FIG. 5 is a plan view showing the bed in the extended position; and

FIG. 6 is a view similar to FIG. 3 showing the bed in the extended position.

Figure 1:
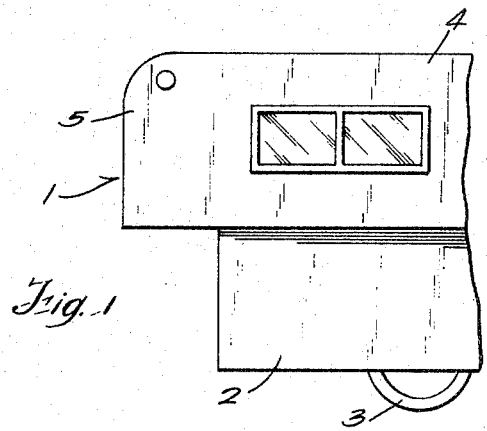
FIG. 1 is a fragmentary side elevation of a telescopic travel trailer incorporating the invention, with the upper trailer section in the extended position.
Figure 2:
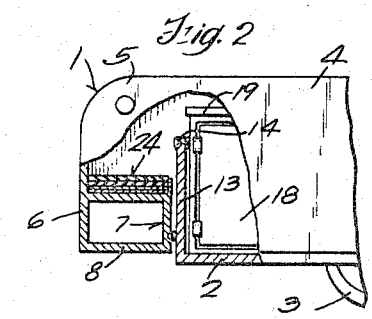
FIG. 2 is a view similar to FIG. 1 showing the upper trailer section in the lower retracted position.

FIG. 1 illustrates a telescopic travel trailer 1 including a lower trailer section 2 which is mounted for travel on a pair of wheels 3. An upper trailer section 4 is supported for telescopic vertical movement with respect to the lower trailer section. During transportation, the upper trailer section 4 is lowered to a retracted position and can be raised to an extended or upper position for camping.

As shown in FIG. 1, the upper trailer section 4 is provided with an overhanging rear portion 5 and the overhanging portion 5 includes an outer vertical end wall 6 and a vertical inner wall 7 which are connected along their bottom edges by a bottom wall 8. In addition, the end wall 6 and the inner wall 7 are connected by a horizontal divided wall 9. The walls 6–9 are fabricated from a series of horizontal and vertical reinforcing members 10 formed of tubular metal, wood or the like, and an outer skin 11 of metal, plastic or plywood is applied to the outer surfaces of the members 10, while an inner skin or layer 12 formed of plywood or the like is secured to the inner surfaces of the members. Suitable insulation can be located between the spaced vertical and horizontal members 10 in the walls.

As best shown in FIG. 4, the inner vertical wall 7 of the overhanging section 5 is spaced outwardly of the rear end wall 13 of the lower trailer section 2. As in the case of the walls 6–9, wall 13 consists of a series of reinforcing members or supports 10 which are covered with an outer skin 11 and an inner layer or skin 12. A cap 14 formed of plastic or the like, is secured to the upper extremity of the end wall 13 and when the upper trailer section 4 is in the raised or extended position the inclined edge portion 15 of cap 14 bears against the resilient seal 16 which is mounted on the inner surface of the wall 7 of the overhanging section 5. The seal 16 is provided with a downwardly extending lip 17 which is secured between the outer skin 11 and the reinforcing members 10 of wall 7. The inclined edge 15 of the cap 14 wedges against the seal 16, compressing the seal and providing an air-tight joint between the upper trailer section 4 and the lower trailer section 2.

Figure 3:
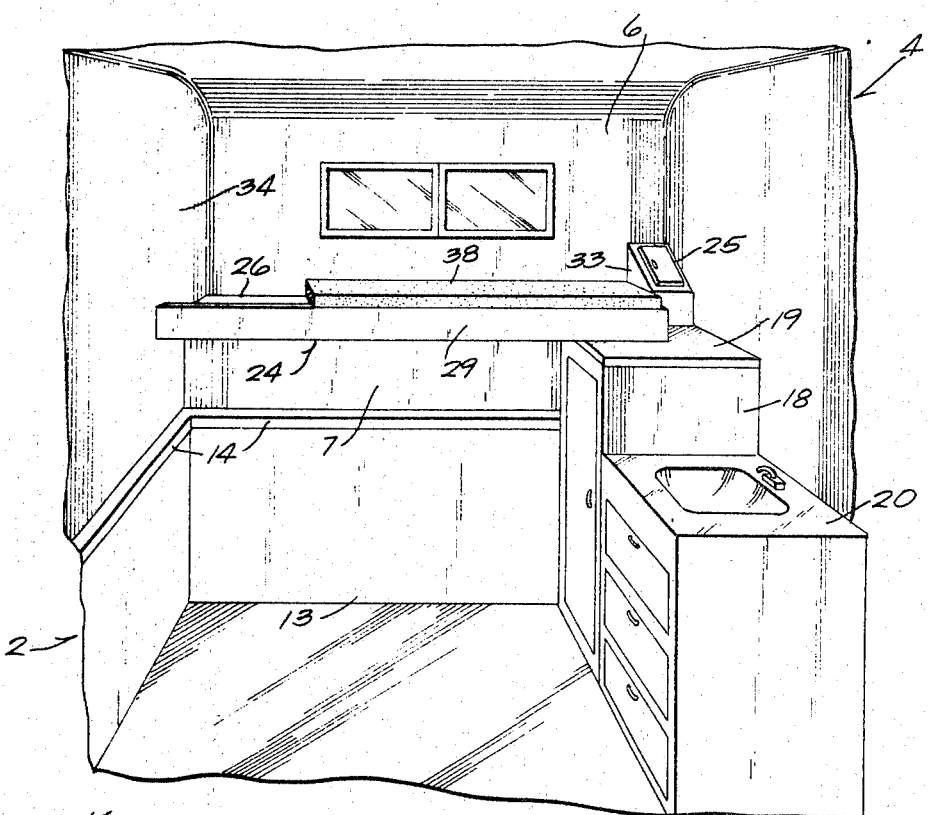
FIG. 3 is a perspective view of the interior of the trailer showing the bed in the extended position.

As best shown in FIGS. 3 and 4, a clothes cabinet 18 rests on the floor of the lower trailer section 2 and the upper surface 19 of cabinet 18 is located at approximately the same level as the horizontal divider wall 9 when the upper trailer section 4 is in the raised position. In addition to the cabinet 18, a sink cabinet 20 is located in the lower trailer section adjacent the cabinet 18.

The horizontal divider wall 9 in overhanging section 5 is provided with an opening 21 which provides access to the storage space 22 located within the overhanging section beneath the horizontal divider wall 9.

According to the invention, an extendible bed is stored in the overhanging section 5 above the divider wall 9 and can be extended to a position over the lower trailer section 2 to provide a full size bed. The bed comprises a lower bed section 23 and an upper bed section 24 which is stored flatwise with respect to the lower bed section, as shown in FIG. 3. The bed sections 23 and 24 have a length less than the width of the trailer section 4, and a clothes hamper 25 is supported on divider wall 9 between the ends of the bed sections and the side wall of the trailer section 4.

The lower bed section 23 comprises an inner member 26 secured to the divider wall 9 and an outer removable member 27 which encloses the opening 21 in the divider wall. By removing the outer member 27, access can be had to the storage space 22.

The upper bed section 24 includes a bottom member 28 and a front member or flange 29 extends upwardly from the front longitudinal edge of the bottom member. As best shown in FIG. 4, the lower edge 30 of the front member 29 projects downwardly and is received within a recess 31 located at the junction of the horizontal wall 9 and the inner vertical wall 7. In the storage position the outer surface of the front member 29 is substantially flush with layer 11 of the vertical wall 7, so that the upper trailer section 4 can be freely telescoped with respect to the lower trailer section 2 without interference from the upper bed section 24. The upper bed section 24 is locked in the storage position by a pair of slide bolts 32 which are mounted on the bottom surface 28, and one of the bolts 32 is adapted to be engaged within the opening in the side wall 33 of hamper 25 while the other bolt 32 is engaged with an opening in the side wall 34 of the upper trailer section 4. The engagement of the slide bolts with the openings serves to lock the upper bed section in the storage position so that it will not move or shift position during transporting of the trailer.

To extend the upper bed section to provide a full size bed, the upper bed section 24 is pulled inwardly until the rear edge 35 of the upper bed section falls in the recess 31 so that the upper surface of the lower bed section 23 and the upper surface of the bottom wall 28 of the upper bed section 24 are substantially flush. In this extended position, one side portion of the upper bed section 24 is supported on the top surface 19 of cabinet 18 while the opposite side portion of the outer bed section is supported by the engagement of the slide bolt 32 with the opening 36 in one of the reinforcing members 10 in the trailer wall 34. To prevent lateral movement of the upper bed section 24 when in the extended position, a bumper 37 is secured to the upper surface 19 of the cabinet 18 and engages the side edge of the upper bed section, thereby preventing it from moving laterally.

A two-section hinged cushion 38 is stored on the upper bunk section 24 when the upper bunk section is in the retracted position as shown in FIG. 4 and the front flange 29 aid in preventing displacement of the cushion 38. When the upper bed section has been moved to the extended position, the cushion 38 is unfolded and will cover both bed sections.

The present invention provides a convenient structure for increasing the sleeping capacity of a telescopic travel trailer. As the convertible bed is located wholly within the overhanging section 5 it will not interfere with the telescopic movement of the upper trailer section 4, nor will it detract from the overall floor space of the lower trailer section. In addition to providing a storage space for the bed the overhanging section 5 of the upper trailer section increases the overall length of the upper trailer section and provides the trailer with a more spacious appearance, thereby improving its marketability.

I claim:

1. In a telescopic travel trailer, a lower trailer section, an upper trailer section disposed to telescope vertically with respect to the lower trailer section from a retracted lower position to an extended upper position, said upper trailer section including an overhanging portion extending outwardly beyond the corresponding portion of the lower trailer section, said overhanging portion including a first bed section and a second bed section movable inwardly from a retracted storage position, in which the second bed section is disposed flatwise with respect to the first bed section, to an extended position in which the second bed section forms an extension of the first bed section and the bed sections together define a bed, first support means associated with the overhanging portion for supporting the outer portion of said second bed section when in the extended position, and second support means carried by the lower trailer section for supporting the inner portion of said second bed section when said second bed section is in the extended position.

2. The structure of claim 1, wherein said second support means comprises a cabinet having a generally flat upper surface to support said second bed section.

3. The structure of claim 1, and including locking means for locking the second bed section in the retracted position.

4. The structure of claim 1, wherein said upper bed section includes an upstanding flange located at the inner edge of said second bed section.

5. The structure of claim 1, wherein said overhanging portion includes an outer vertical wall and an inner vertical wall disposed adjacent the lower trailer section, the inner edge of said first bed section terminating short of the inner surface of said inner vertical wall to provide a recess, the inner edge of said second bed section being provided wtih a downwardly extending ridge disposed to be received within said recess when the second bed section is in the retracted position.

6. The structure of claim 5, wherein the inner edge of said second bed section is provided with an upstanding flange and said flange is disposed substantially flush with the inner surface of said inner vertical wall when said second bed section is in the retracted position.

7. The structure of claim 5, wherein said overhanging portion also includes a bottom wall connecting said outer vertical wall and said inner vertical wall and a divider wall spaced above said bottom wall and connecting said outer vertical wall and the inner vertical wall, the space defined by said bottom wall, said divider wall and said vertical walls comprising a storage area, said first bed section being supported on said divider wall.

8. In a telescopic travel trailer, a lower trailer section, an upper trailer section disposed to telescope vertically with respect to the lower trailer section from a retracted lower position to an extended upper position, said upper trailer section including an overhanging portion extending outwardly beyond the corresponding portion of the lower trailer section, said overhanging portion including a first bed section and a second bed section movable inwardly from a retracted storage position, in which the second bed section is disposed flat wise with respect to the first bed section, to an extended position in which the second bed section forms an extension of the first bed section and the bed sections together define a bed, said first bed section and said second bed section when in said retracted position being located entirely within said overhanging portion so that said bed sections will not interfere with the telescopic movement of the upper trailer section, said second bed section when in the extended position being located above said lower trailer section, and support means for supporting the second bed section in the extended position.

9. The structure of claim 8, wherein the overhanging portion extends beyond the rear end of the upper trailer section and said bed sections extend transversely of the fore-to-aft direction of the trailer section.

10. The structure of claim 9, wherein said bed sections have a length substantially less than the transverse dimension of the upper trailer section, and said structure includes means for preventing transverse displacement of the second bed section when in the extended position.

References Cited
UNITED STATES PATENTS 3,371,954  3/1968  Larsson _____ 296—23
3,362,745  1/1968  Flajole _____ 296—27

PHILIP GOODMAN, Primary Examiner

U.S. Cl. X.R.

52—66

UNITED STATES PATENT OFFICE
CERTIFICATE OF CORRECTION

Patent No. 3,488,083                          Dated January 6, 1970

Inventor(s) John W. Ratcliff

It is certified that error appears in the above-identified patent and that said Letters Patent are hereby corrected as shown below:

Column 1, line 41, after "section" delete "and can be extended inwardly to a location" and insert --is provided with an overhang which projects--

Column 2, line 30, cancel "transportation" and substitute --transporting--

SIGNED AND SEALED

JUL 14 1970

(SEAL)
Attest:

Edward M. Fletcher, Jr.
Attesting Officer

WILLIAM E. SCHUYLER, JR.
Commissioner of Patents